(12) United States Patent
Li et al.

(10) Patent No.: US 9,059,849 B2
(45) Date of Patent: Jun. 16, 2015

(54) METHOD, SYSTEM AND APPARATUS OF MULTI-SUBFRAME SCHEDULING

(71) Applicant: Huawei Technologies Co., Ltd., Shenzhen (CN)

(72) Inventors: Bo Li, Shenzhen (CN); Yongxia Lv, Shenzhen (CN); Yuhua Chen, Shenzhen (CN); Chaojun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 13/624,438

(22) Filed: Sep. 21, 2012

(65) Prior Publication Data

US 2013/0016686 A1   Jan. 17, 2013

Related U.S. Application Data

(63) Continuation of application No. PCT/CN2011/072026, filed on Mar. 22, 2011.

(30) Foreign Application Priority Data

Mar. 22, 2010   (CN) .......................... 2010 1 0131399

(51) Int. Cl.
*H04W 4/00* (2009.01)
*H04L 1/18* (2006.01)
(Continued)

(52) U.S. Cl.
CPC ............ *H04L 1/1887* (2013.01); *H04L 1/1822* (2013.01); *H04L 1/1864* (2013.01); *H04L 1/1896* (2013.01); *H04W 28/06* (2013.01); *H04W 28/18* (2013.01); *H04W 72/1278* (2013.01)

(58) Field of Classification Search
None
See application file for complete search history.

(56) References Cited

U.S. PATENT DOCUMENTS 7,996,029 B2 *  8/2011  Chun et al. .................... 455/509
2007/0064669 A1 *  3/2007  Classon et al. ................. 370/347
(Continued)

FOREIGN PATENT DOCUMENTS

CN   101426267 A   5/2009
CN   101527929 A   9/2009
(Continued)

OTHER PUBLICATIONS

Written Opinion of the International Searching Authority issued in corresponding PCT Patent Application No. PCT/CN2011/072026, mailed Jul. 7, 2011.
(Continued)

*Primary Examiner* — Ian N Moore
*Assistant Examiner* — Phong La
(74) *Attorney, Agent, or Firm* — Brinks Gilson & Lione

(57) ABSTRACT

The present invention discloses a method, system and apparatus of multi-subframe scheduling. The method of multi-subframe scheduling comprises: sending a terminal a continuous scheduling indication, a first Hybrid Automatic Repeat Request (HARQ) process number corresponding to a first scheduled subframe, and a scheduling configuration parameter of multi-subframe scheduling; acquiring a second HARQ process number corresponding to a currently-scheduling subframe according to the first HARQ process number corresponding to the first scheduled subframe and the continuous scheduling indication, and performing a data packet transmission of the corresponding second HARQ process number in the currently-scheduling subframe by using the scheduling configuration parameter, each scheduled subframe of the multi-subframe scheduling carrying one data packet, and each scheduled subframe of the multi-subframe scheduling using the scheduling configuration parameter. The embodiments of the present invention may save control signaling overhead of the system and improve spectrum efficiency of the system.

9 Claims, 4 Drawing Sheets

(51) Int. Cl.
*H04W 28/06* (2009.01)
*H04W 28/18* (2009.01)
*H04W 72/12* (2009.01)

(56) References Cited

U.S. PATENT DOCUMENTS

| | | | |
|---|---|---|---|
| 2009/0103500 A1* | 4/2009 | Malkamaki et al. | 370/336 |
| 2009/0238128 A1* | 9/2009 | Park et al. | 370/329 |
| 2010/0074215 A1* | 3/2010 | Park et al. | 370/329 |
| 2010/0278139 A1* | 11/2010 | Liu et al. | 370/330 |
| 2010/0322114 A1* | 12/2010 | Li et al. | 370/278 |
| 2011/0051666 A1* | 3/2011 | Kim et al. | 370/328 |
| 2011/0093756 A1* | 4/2011 | Yang et al. | 714/748 |
| 2011/0141901 A1* | 6/2011 | Luo et al. | 370/241 |
| 2011/0194443 A1* | 8/2011 | Li et al. | 370/252 |
| 2011/0256879 A1* | 10/2011 | Chun et al. | 455/450 |
| 2012/0051305 A1* | 3/2012 | Wang et al. | 370/329 |
| 2012/0127938 A1* | 5/2012 | Lv et al. | 370/329 |
| 2012/0176957 A1* | 7/2012 | Chen et al. | 370/315 |

FOREIGN PATENT DOCUMENTS

| | | |
|---|---|---|
| CN | 101615988 A | 12/2009 |
| CN | 101971681 A | 2/2011 |
| WO | WO 2006047851 A1 | 5/2006 |
| WO | WO 2008054313 A1 | 5/2008 |
| WO | WO 2009064059 A1 | 5/2009 |
| WO | WO 2009152637 A1 | 12/2009 |

OTHER PUBLICATIONS

International Search Report issued in corresponding PCT Patent Application No. PCT/CN2011/072026, mailed Jul. 7, 2011.
Extended European Search Report issued in corresponding European Patent Application No. 11758790.7, mailed Jan. 21, 2013.
Office Action issued in corresponding Chinese Patent Application No. 201010131399.9, mailed Apr. 1, 2013.

* cited by examiner

METHOD, SYSTEM AND APPARATUS OF MULTI-SUBFRAME SCHEDULING

CROSS-REFERENCE TO RELATED APPLICATIONS

This application is a continuation of International Application No. PCT/CN2011/072026 filed on Mar. 22, 2011, which claims priority to Chinese Patent Application No. 201010131399.9, filed on Mar. 22, 2010, both of which are hereby incorporated by reference in their entireties.

FIELD OF TECHNOLOGY

The embodiments of the present invention relates to technologies, and particularly, to a method, system and apparatus of multi-subframe scheduling.

BACKGROUND

In the existing 3rd Generation Partnership Project (3rd Generation Partnership Project, 3GPP for short) Evolved Universal Mobile Telecommunications System (Universal Mobile Telecommunications System, UMTS for short) Terrestrial Radio Access (Evolved-UMTS Terrestrial Radio Access, E-UTRA for short) system, two modes, Frequency Division Duplexing (Frequency Division Duplexing, FDD for short) and Time Division Duplexing (Time Division Duplexing, TDD for short) are supported. In the Long Term Evolution (Long Term Evolution, LTE for short) system, a terminal receives downlink data and transmits uplink data on uplink and downlink resources respectively, according to an indication of Physical Downlink Control Channel (Physical Downlink Control Channel, PDCCH for short) sent by a base station. In a LTE FDD system, the maximum of number of Hybrid Automatic Repeat Request (Hybrid Automatic Repeat Request, HARQ for short) processes is 8, and synchronized adaptive or non-adaptive retransmission is adopted in uplink, and non-synchronized adaptive retransmission is adopted in downlink. In the LTE TDD system, the maximum of number of HARQ processes is 15.

Uplink data transmission is taken as an example. A base station sends a corresponding uplink resource indication (UL grant) on a PDCCH resource in subframe 0 to perform uplink subframe scheduling. Upon receiving the PDCCH, the terminal acquires resource position and corresponding transmission configuration indication information of uplink transmission. According to a timing relationship specified by the LTE protocol, the terminal may transmit uplink service data needed on a corresponding resource in the fourth subframe after the subframe in which the PDCCH is received. Upon receiving the data packet transmitted by the terminal, the base station may determine whether the data packet is correct by Cyclic Redundancy Check (Cyclic Redundancy Check, CRC for short). In the fourth subframe after the terminal transmits the uplink data, the base station sends indication information indicating whether the data packet is correct. If an error occurs to the data packet, the base station makes the PDCCH of the subframe which carries error information carry a retransmission UL grant of retransmitted data packet simultaneously. The terminal performs a new data transmission according to corresponding retransmission PDCCH information until the terminal receives an Acknowledgment (Acknowledgment, ACK for short) indication sent by the base station, or gives up the retransmission of the existing data packet when the maximum of times of data retransmission is reached.

For downlink data transmission, upon receiving a data packet sent by the base station, the terminal needs to feed back corresponding uplink ACK or Non-Acknowledgment (Non-Acknowledgment, NAK for short) information, wherein there is a mapping relationship between the existing serial number of uplink ACK/NACK and a corresponding PDCCH transmission position of the terminal. The terminal may send the ACK/NACK information on a corresponding uplink transmission resource according to the PDCCH transmission position.

In the existing LTE specifications, each PDCCH schedules resources of one subframe to perform data transmission. Since each newly-transmitted data packet needs a PDCCH resource scheduling indication, in the case that a user channel is stable, frequent change of configuration information of data transmission will cause higher signaling overhead and lower spectrum efficiency.

SUMMARY

Embodiments of the present invention provide a method, system and apparatus of multi-subframe scheduling, so as to address issues that, in the prior art, control signaling overhead of a system is high and spectrum efficiency is lower, thus reducing the control signaling overhead of the system and improving the spectrum efficiency.

An embodiment of the present invention provides a method of multi-subframe scheduling, including: sending to a terminal a continuous scheduling indication of multi-subframe scheduling, a Hybrid Automatic Repeat Request process number corresponding to a first scheduled subframe and a scheduling configuration parameter; acquiring a Hybrid Automatic Repeat Request process number corresponding to a currently-scheduling subframe according to the Hybrid Automatic Repeat Request process number corresponding to the first scheduled subframe and the continuous scheduling indication, and performing a data packet transmission of the corresponding Hybrid Automatic Repeat Request process number in the currently-scheduling subframe by using the scheduling configuration parameter. Each scheduled subframe of the multi-subframe scheduling carries one data packet, and each scheduled subframe of the multi-subframe scheduling utilizes the scheduling configuration parameter.

An embodiment of the present invention provides a method of multi-subframe scheduling, including: receiving a continuous scheduling indication of multi-subframe scheduling, a Hybrid Automatic Repeat Request process number corresponding to a first scheduled subframe and a scheduling configuration parameter sent by a base station; acquiring a Hybrid Automatic Repeat Request process number corresponding to a currently-scheduling subframe according to the Hybrid Automatic Repeat Request process number corresponding to the first scheduled subframe and the continuous scheduling indication, and performing a data packet transmission of the corresponding Hybrid Automatic Repeat Request process number in the currently-scheduling subframe by using the scheduling configuration parameter. Each scheduled subframe of the multi-subframe scheduling carries one data packet, and each scheduled subframe of the multi-subframe scheduling utilizes the scheduling configuration parameter.

An embodiment of the present invention provides a base station, including: a scheduling indication sending module for sending to a terminal a continuous scheduling indication of multi-subframe scheduling, a Hybrid Automatic Repeat Request process number corresponding to a first scheduled subframe, and a scheduling configuration parameter; a data packet transmission module for acquiring a Hybrid Automatic Repeat Request process number corresponding to a currently-scheduling subframe according to the Hybrid Automatic Repeat Request process number corresponding to the first scheduled subframe and the continuous scheduling indication, and performing data packet transmission of the corresponding Hybrid Automatic Repeat Request process number in the currently-scheduling subframe by using the scheduling configuration parameter. Each scheduled subframe of the multi-subframe scheduling carries one data packet, and each scheduled subframe of the multi-subframe scheduling utilizes the scheduling configuration parameter.

An embodiment of the present invention provides a terminal, including: a scheduling indication receiving module for receiving a continuous scheduling indication of multi-subframe scheduling, a Hybrid Automatic Repeat Request process number corresponding to a first scheduled subframe and a scheduling configuration parameter sent by a base station; a data packet transmission module for acquiring a Hybrid Automatic Repeat Request process number corresponding to a currently-scheduling subframe according to the Hybrid Automatic Repeat Request process number corresponding to the first scheduled subframe and the continuous scheduling indication, and performing data packet transmission of the corresponding Hybrid Automatic Repeat Request process number in the currently-scheduling subframe by using the scheduling configuration parameter; each scheduled subframe of the multi-subframe scheduling carrying one data packet, and each scheduled subframe of the multi-subframe scheduling utilizing the scheduling configuration parameter.

An embodiment of the present invention provides a system of multi-subframe scheduling, including any one of the above base stations and any one of the above terminals.

The method, system and apparatus of multi-subframe scheduling may realize multi-subframe scheduling by sending a Hybrid Automatic Repeat Request process number of each currently-scheduling subframe and a continuous scheduling indication, thus saving control signaling overhead of the system and improving spectrum efficiency of the system.

BRIEF DESCRIPTION OF THE DRAWINGS

To illustrate the technical solution under the embodiments of the present invention or the prior art more clearly, a brief introduction on the accompanying drawings which are needed in the description of the embodiments or the prior art is given below. Apparently, the accompanying drawings in the description below are merely some of the embodiments of the present invention, based on which other drawings may be acquired by the persons of ordinary skill in the art without any inventive effort.

FIG. 4a is a schematic diagram of a third embodiment of the method of multi-subframe scheduling according to the present invention;

FIG. 4b is a schematic diagram of the process of prolonging the number of continuously-scheduled subframes in the third embodiment of the method of multi-subframe scheduling according to the present invention;

FIG. 5 is a schematic diagram of a fourth embodiment of the method of multi-subframe scheduling according to the present invention;

FIG. 6 is a schematic diagram of a fifth embodiment of the method of multi-subframe scheduling according to the present invention;

DETAILED DESCRIPTION OF THE EMBODIMENTS

In order to better understand the objectives, solutions and advantages of the embodiments of the present invention, the technical solutions according to the embodiments of the present invention will be described clearly and completely hereinafter with reference to the accompanying drawings in the embodiments of the present invention. Evidently, the described embodiments are merely part, but not all, of the embodiments of the present invention. All other embodiments, which can be derived by the persons of ordinary skills in the art based on the embodiments of the present invention without any inventive efforts, shall fall into the protection scope of the present invention.

Figure 1:
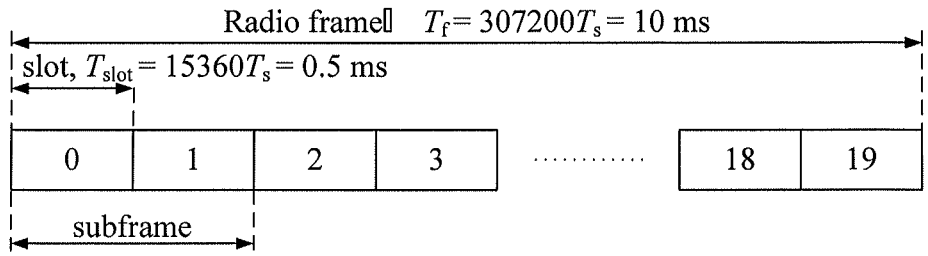
FIG. 1 illustrates a frame structure of a FDD mode according to an embodiment of the present invention.

FIG. 1 illustrates a frame structure of a FDD mode according to an embodiment of the present invention. Each radio frame has a length of 10 milliseconds and consists of two half-frames each of which has a length of 5 milliseconds. Each radio frame consists of 20 slots each of which has a length of 0.5 millisecond. Each subframe consists of two slots and has a length of 1 millisecond.

Figure 2:
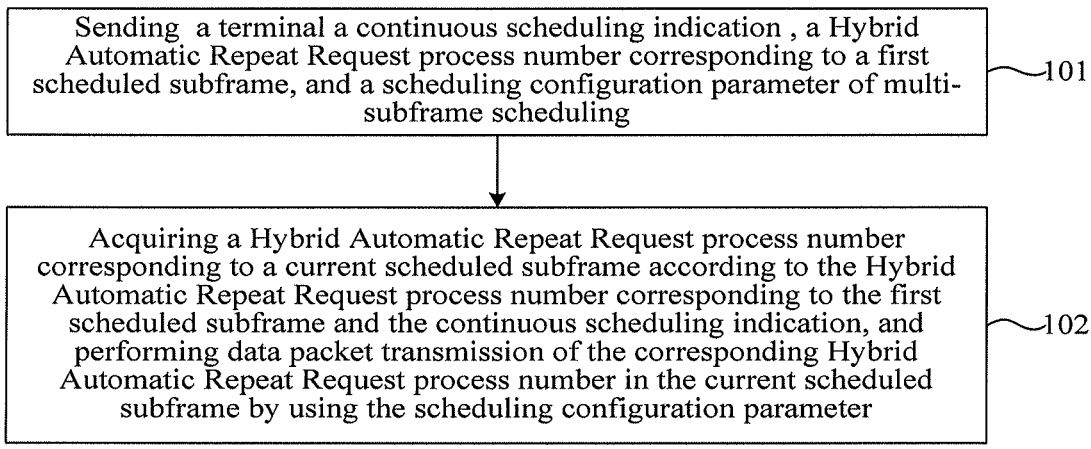
FIG. 2 is a flowchart of the first embodiment of a method of multi-subframe scheduling according to the present invention.

FIG. 2 is a flowchart of a first embodiment of a method of multi-subframe scheduling according to the present invention. As shown in FIG. 2, the method of multi-subframe scheduling includes the following contents.

Step 101: a continuous scheduling indication, a Hybrid Automatic Repeat Request process number corresponding to a first scheduled subframe and a scheduling configuration parameter of multi-subframe scheduling are sent to a terminal.

Particularly, step 101 may include the following cases.

Case 1: a higher layer signaling carrying the continuous scheduling indication and notifying the terminal to start or to cancel multi-subframe scheduling is sent to the terminal, and a Physical Downlink Control Channel carrying the scheduling configuration parameter and the Hybrid Automatic Repeat Request process number corresponding to the first scheduled subframe is sent to the terminal.

Firstly, the terminal may be notified to start the multi-subframe scheduling by a higher layer signaling, for example, a multi-subframe scheduling starting signaling of the higher layer, and the continuous scheduling indication of this scheduling, for example, the number of all continuously-scheduled subframes or the number of continuously-scheduled subframes after the first scheduled subframe is sent to the terminal simultaneously. And then, the scheduling configuration parameter and the Hybrid Automatic Repeat Request process number corresponding to the first scheduled subframe are sent to the terminal by a physical layer signaling, for example, a Physical Downlink Control Channel.

Case 2: a Physical Downlink Control Channel carrying the continuous scheduling indication, the Hybrid Automatic Repeat Request process number corresponding to the first scheduled subframe and a scheduling configuration parameter is sent to the terminal.

Firstly, the base station may notify the terminal to start the multi-subframe scheduling by a higher layer signaling, for example, a multi-subframe scheduling starting signaling of the higher layer, and then send the terminal the scheduling configuration parameter, the continuous scheduling indication and the Hybrid Automatic Repeat Request process number corresponding to the first scheduled subframe by a physical layer signaling, for example, a Physical Downlink Control Channel (PDCCH). The PDCCH may include a downlink resource indication, for example, DL scheduling, and may also include an uplink resource indication, for example, UL grant.

In case 2, the above method of carrying the number of the subframes of this scheduling may include setting the continuous scheduling indication in a newly-increased bit or reused bit of the Physical Downlink Control Channel. The reused bit is a Redundancy Version (Redundancy Version, RV for short) field in a downlink resource indication of the Physical Downlink Control Channel, or a padding bit in a uplink resource indication of the Physical Downlink Control Channel.

In case 2 above, the signaling occupied by the multi-subframe scheduling may be reduced by adopting the direct transmission of the continuous scheduling indication in the PDCCH, which helps to save signaling resources. The existing PDCCH resources may be used directly by using the reused bit of the PDCCH such as Redundancy Version field or padding bit, etc., without the need to increase an information element of the PDCCH, which facilitates the setting and further saves signaling resources.

Step 102: a Hybrid Automatic Repeat Request process number corresponding to a currently-scheduling subframe is acquired according to the Hybrid Automatic Repeat Request process number corresponding to the first scheduled subframe and the continuous scheduling indication, and transmission of a data packet of the corresponding Hybrid Automatic Repeat Request process number is performed in the currently-scheduling subframe by using the scheduling configuration parameter.

In the present embodiment, each scheduled subframe of the above multi-subframe scheduling carries one data packet, and each scheduled subframe of the above multi-subframe scheduling uses the above scheduling configuration parameter.

When the continuous scheduling indication includes the number of all continuously-scheduled subframes or the number of continuously-scheduled subframes after the first scheduled subframe, the specific process of acquiring a Hybrid Automatic Repeat Request process number corresponding to a currently-scheduling subframe according to the Hybrid Automatic Repeat Request process number corresponding to the first scheduled subframe and the continuous scheduling indication may include that a minimum value is selected each time from currently-available Hybrid Automatic Repeat Request process numbers as the hybrid Automatic Repeat Request process number of the currently-scheduling subframe according to the number of all continuously-scheduled subframes or the number of continuously-scheduled subframes after the first scheduled subframe, or that one of currently-available Hybrid Automatic Repeat Request process numbers is selected as the Hybrid Automatic Repeat Request process number of the currently-scheduling subframe in an ascending order, according to the number of all continuously-scheduled subframes or the number of continuously-scheduled subframes after the first scheduled subframe and the Hybrid Automatic Repeat Request process number corresponding to the first scheduled subframe.

Furthermore, if a data packet carried in each scheduled subframe of the multi-subframe scheduling is a newly-transmitted data packet and there is Non-Acknowledge information in feedback information acquired by transmitting the newly-transmitted data packet, a retransmission resource indication signaling carrying a Hybrid Automatic Repeat Request process number corresponding to the Non-Acknowledge information is sent to the terminal, and a retransmitted data packet of the Hybrid Automatic Repeat Request process number corresponding to the Non-Acknowledge information is received from the terminal or is sent to the terminal in a retransmission subframe corresponding to the retransmission resource indication signaling. Particularly, the base station may preset a retransmission delay time, and send it to the terminal by carrying it in the retransmission resource indication signaling, or notify the terminal of it by other signaling. After the set retransmission delay time, the base station schedules the retransmitted data packet of the Hybrid Automatic Repeat Request process number corresponding to the Non-Acknowledge information included in the retransmission resource indication signaling.

Furthermore, if the newly-transmitted data packet and the retransmitted data packet are scheduled in a same scheduled subframe, the retransmitted data packet is preferably scheduled in the same scheduled subframe.

Furthermore, in each multi-subframe scheduling, when the newly-transmitted data packet of the Hybrid Automatic Repeat Request process number corresponding to the currently-scheduling subframe is scheduled, errors may occur continuously, and thus there are multiple pieces of Non-Acknowledge information in feedback information acquired. At this time, if there are continuous multiple pieces of Non-Acknowledge information in the feedback information acquired by transmitting the newly-transmitted data packet, the retransmission resource indication signaling further includes the number of all continuous retransmission subframe corresponding to the continuous multiple pieces of Non-Acknowledge information or the number of continuous retransmission subframes after a first retransmission subframe.

When there is a stronger interference between the base station of the present cell and the base station of an adjacent cell, the interference may be avoided or decreased by a method of reserving a resource. The specific method is to obtain the information of the adjacent cell from an interface between base stations, wherein the information of the adjacent cell includes one or more of the following: frequency domain position occupied by a Physical Downlink Control Channel allocated by the base station of the adjacent cell, transmission time and transmission power, or includes one or more of the following: frequency domain position occupied by the Physical Uplink Control Channel allocated by the base station of the adjacent cell, transmission time and transmission power. The information of a strong interference cell whose interference level is higher than a set threshold value is acquired according to the information of the adjacent cell, Physical Downlink Control Channels of the strong interference cell and the present cell are coordinately allocated in different subframes according to the information of the strong interference cell, and the scheduled subframe in which the base station of the present cell sends the Physical Downlink Control Channel of the multi-subframe scheduling to the terminal is determined, and thus time domain resources are reserved for the Physical Downlink Control Channels of the strong interference cell and the present cell. Or, the Physical Uplink Control Channels of the strong interference cell and the present cell are coordinately allocated in different frequency bands which are not overlapped with each other, and thus frequency domain resources are reserved for the Physical Uplink Control Channels of the strong interference cell and the present cell, so as to feed back ACK or NAK information.

In addition, in semi-persistent scheduling, a semi-persistent subframe scheduling interval may be sent to the terminal by a higher layer signaling. The semi-persistent subframe scheduling interval whose value is 1, 2, 4, 5, 8, may be added to the existing semi-persistent scheduling period. And, the terminal is notified of a corresponding semi-persistent transmission scheduling length for indication. In the specific scheduling, the base station schedules the newly-transmitted data packet of the Hybrid Automatic Repeat Request process number corresponding to the currently-scheduling subframe in each semi-persistent subframe scheduling interval, according to the Hybrid Automatic Repeat Request process number corresponding to the first scheduled subframe, the continuous scheduling indication and the semi-persistent subframe scheduling interval in each multi-subframe scheduling.

The present embodiment may realize multi-subframe scheduling by that the base station sends the scheduling configuration parameter, the continuous scheduling indication and the Hybrid Automatic Repeat Request process number corresponding to the first scheduled subframe to the terminal, saving control signaling overhead of the system and improving spectrum efficiency of the system. It may be more compatible with the existing system by adopting single-subframe scheduling in retransmission, while the control signaling overhead of the system may be further reduced and the performance of the system may be improved by adopting multi-subframe scheduling in retransmission. When a single PDCCH is used to perform data scheduling of multiple subframes, a resource may be reserved, and interaction information may be sent by control channels between base stations when there is an adjacent strong interference cell, which avoids that the control channels of strong interference cells schedule data in a same time, thus reducing interference between the control channels.

Figure 3:
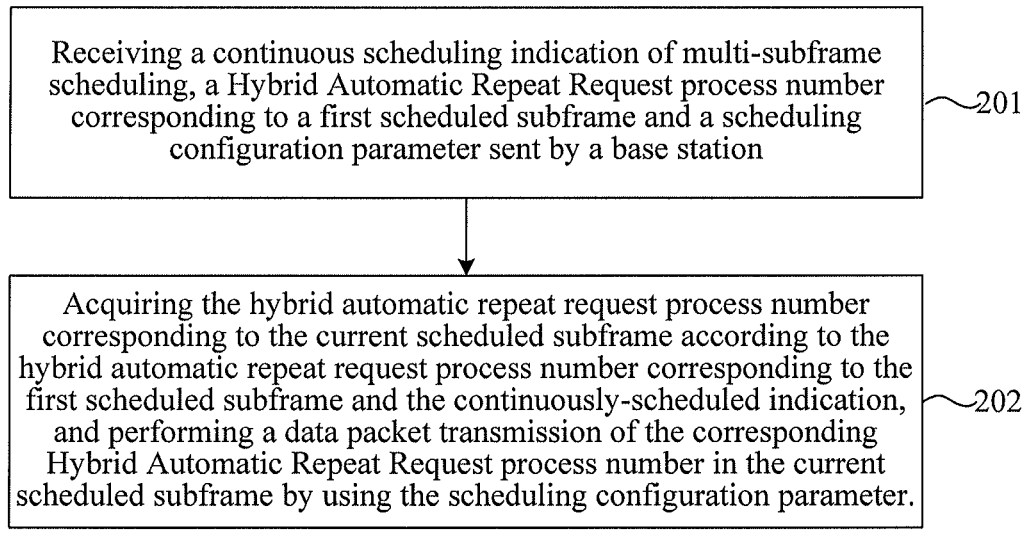
FIG. 3 is a flowchart of a second embodiment of the method of multi-subframe scheduling according to the present invention.

FIG. 3 is a flowchart of a second embodiment of a method of multi-subframe scheduling according to the present invention. As shown in FIG. 3, the method of multi-subframe scheduling includes the following contents.

Step 201: a continuous scheduling indication, a Hybrid Automatic Repeat Request process number corresponding to a first scheduled subframe and a scheduling configuration parameter of a multi-subframe scheduling sent by a base station are received.

Specifically, step 201 may include the following cases.

Case 1: a higher layer signaling carrying the continuous scheduling indication sent by the base station is received, the higher layer signaling is used for notifying the terminal to start or to cancel the multi-subframe scheduling, and a Physical Downlink Control Channel carrying the scheduling configuration parameter and the Hybrid Automatic Repeat Request process number corresponding to the first scheduled subframe sent by the base station is received.

The terminal may acquire a starting indication of the multi-subframe scheduling from the higher layer signaling of the base station, for example, a multi-subframe scheduling starting signaling, and acquire the continuous scheduling indication of this scheduling simultaneously, for example, the number of all continuously-scheduled subframes, or the number of continuously-scheduled subframes after the first scheduled subframe. And then, the Hybrid Automatic Repeat Request process number corresponding to the first scheduled subframe is acquired by a physical layer signaling of the base station, for example, a Physical Downlink Control Channel.

Case 2: a Physical Downlink Control Channel carrying the continuous scheduling indication, the Hybrid Automatic Repeat Request process number corresponding to the first scheduled subframe and the scheduling configuration parameter sent by the base station is received.

Firstly, the terminal may acquire a starting indication of the multi-subframe scheduling from a higher layer signaling of the base station, for example, a multi-subframe scheduling starting signaling, then acquire the scheduling configuration parameter, the Hybrid Automatic Repeat Request process number corresponding to the first scheduled subframe and the continuous scheduling indication from a physical layer signaling, for example, Physical Downlink Control Channel (PDCCH). The PDCCH may include a downlink resource indication, for example, DL scheduling, and may also include an uplink resource indication, for example, UL grant. The continuous scheduling indication may be acquired from a newly-increased bit or a reused bit of the PDCCH, wherein the reused bit may be a Redundancy Version field in the downlink resource indication of the PDCCH, or a padding bit in the uplink resource indication of the PDCCH.

In addition, the terminal may determine whether this scheduling is single-subframe scheduling or multi-subframe scheduling, according to a downlink transmission control information format in the Physical Downlink Control Channel received. For example, in downlink transmission, the PDCCH adopts multiple kinds of Downlink Control Information (Downlink Control Information, DCI for short) formats to perform downlink scheduling transmission. In the case that a multi-subframe scheduling transmission mode is started, part of the DCI formats may be reserved for single-subframe scheduling of newly-transmitted data, and other DCI formats may be used for multi-subframe scheduling. The formats of the PDCCH include DCI format 0 for uplink scheduling, and further include DCI formats 1, 1*a*, 1*b*, 1*c*, 2, 2*a*, 3 for downlink resource scheduling, so as to perform downlink resource indication in different transmission modes. DCI format 0 is used for uplink scheduling, which includes a resource scheduling indication field, a new data indication field, a Demodulation Reference Signal (Demodulation Reference Signal, DMRS for short) cycle shift indication field, a modulation and coding indication field, a Channel Quality Indicator (Channel Quality Indicator, CQI for short) request field, a Cyclical Redundancy Check (Cyclical Redundancy Check, CRC for short) field and the like. Other DCI format is used for indicating downlink data scheduling, which includes a resource scheduling indication field, a new data indication field, a modulation and coding indication field, a power control indication field, a CRC field, HARQ process indication field, a Redundancy Version indication field and the like. In part of the DCI formats, there are 1 or 2 unused bits for meeting the requirement of code rate to be used for padding. It is assumed that DCI 1*a* is reserved for single subframe scheduling, and other formats are reserved for multi-subframe scheduling. In uplink transmission, only DCI format 0 is used for uplink transmission scheduling, and other uplink scheduling DCI formats may be added in the LTE-A protocol. It may be determined whether single-subframe scheduling or multi-subframe scheduling is adopted currently according to the different DCI formats of the PDCCH.

Step 202: a Hybrid Automatic Repeat Request process number corresponding to a currently-scheduling subframe is acquired according to the Hybrid Automatic Repeat Request process number corresponding to the first scheduled subframe and the continuous scheduling indication, and a data packet transmission of the corresponding Hybrid Automatic Repeat Request process number is performed in the currently-scheduling subframe by using the scheduling configuration parameter.

In the present embodiment, each scheduled subframe of the above multi-subframe scheduling carries one data packet, and each scheduled subframe of the above multi-subframe scheduling utilizes the scheduling configuration parameter.

If the continuous scheduling indication includes the number of all continuously-scheduled subframe or the number of continuously-scheduled subframes after the first scheduled subframe, after the base station sends the terminal the multi-subframe scheduling start signaling, the process of acquiring a Hybrid Automatic Repeat Request process number corresponding to a currently-scheduling subframe according to the Hybrid Automatic Repeat Request process number corresponding to the first scheduled subframe and the continuous scheduling indication may include the following examples.

EXAMPLE 1 a minimum value is selected each time from currently-available Hybrid Automatic Repeat Request process numbers as the Hybrid Automatic Repeat Request process number of the currently-scheduling subframe, according to the number of all continuously-scheduled subframes or the number of continuously-scheduled subframes after the first scheduled subframe.

EXAMPLE 2 one of the currently-available Hybrid Automatic Repeat Request process numbers is selected as the Hybrid Automatic Repeat Request process number of the currently-scheduling subframes each time in an ascending order, according to the number of all continuously-scheduled subframes or the number of continuously-scheduled subframes after the first scheduled subframe and the Hybrid Automatic Repeat Request process number corresponding to the first scheduled subframe.

The present embodiment may realize multi-subframe scheduling by that the terminal receives the scheduling configuration parameter, the continuous scheduling indication and the Hybrid Automatic Repeat Request process number corresponding to the first scheduled subframe sent by the base station, saving control signaling overhead of the system and improving spectrum efficiency of the system. It may be more compatible with the existing system by adopting single-subframe scheduling in retransmission, while the control signaling overhead of a system may be further reduced and the performance of the system may be improved by adopting multi-subframe scheduling in retransmission. When a single PDCCH is used to perform data scheduling of multiple subframes, a resource may be reserved, and the interaction information may be sent by control channels between base stations when there is an adjacent strong interference cell, which avoids that data is scheduled on the control channels of the strong interference cells in a same time, thus reducing the interference between the control channels.

Figures 4A, 4B, 5, 6:
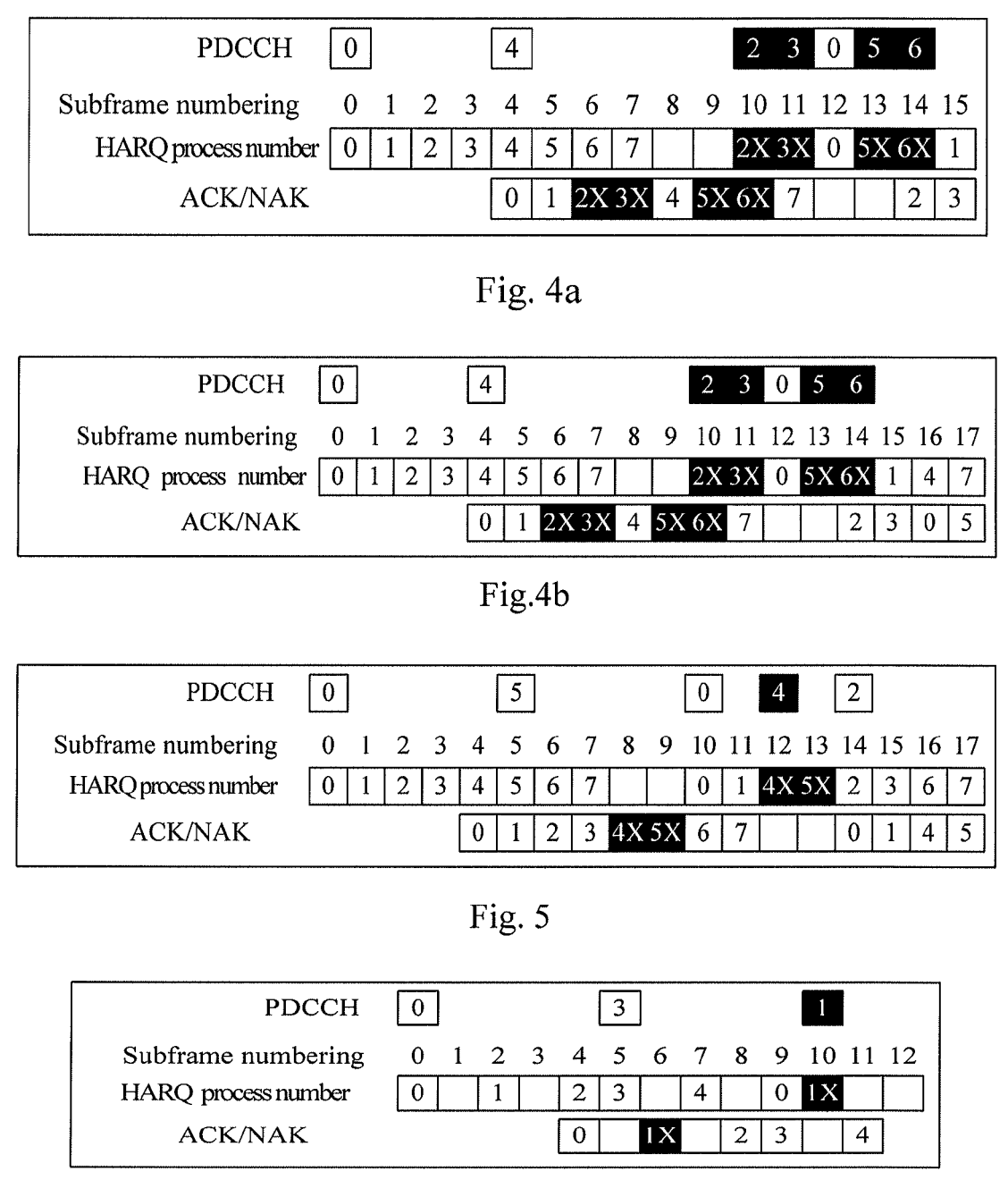

FIG. 4a is a schematic diagram of a third embodiment of a method of multi-subframe scheduling according to the present invention. A base station sends a UE a multi-subframe scheduling starting signaling, for instructing a terminal to start a data transmission mode of multi-subframe receiving and sending. The multi-subframe scheduling starting signaling may be sent by a higher layer signaling (for example, an MAC or RLC layer signaling), to configure for newly-transmitted data packets the number of subframes which need to be scheduled each time, for example, the number of the continuously-sent or continuously-received subframes in each multi-subframe scheduling, wherein the range of the number may be larger than 1, but less than or equal to the maximum value of the number of HARQ processes of the system, such as 2, 3, 4, 5, 6, 7, 8, etc. The base station may perform a continuous subframes scheduling configuration or change the corresponding configuration of a current user according to the service type of the current transmission, number of cell users, and user channel condition and other information, and notify the terminal of the change information of the corresponding configuration by a higher layer signaling. The terminal schedules the corresponding resources to perform data transmission according to the moment at which the base station sends the PDCCH.

In an embodiment of the present invention, the terminal may acquire the continuous scheduling indication from the higher layer singling or physical layer control signaling received, and acquire the scheduling configuration parameter, the HARQ process number of the first scheduled subframe, the feedback position corresponding to the individual Acknowledge/Non-Acknowledge (ACK/NACK) and other information from the physical layer control signaling. As shown in FIG. 4a, it is assumed that the number of the configured moments, namely, subframes, which need to be continuously scheduled in each multi-subframe scheduling is four, and at the first moment, namely, the first subframe #0, the terminal receives the PDCCH of downlink transmission sent by the base station, wherein the PDCCH carries a current HARQ process number corresponding to the PDCCH corresponding to the first scheduled subframe, a modulation and coding mode, a resource indication and other information, which correspondingly indicates subframe #0, subframe #1, subframe #2, subframe #3 which may be continuously scheduled this time. At this time, there is a PDCCH which is sent in the first subframe #0, while there is no PDCCH which is sent in the subsequent three subframes, subframe #1, subframe #2, subframe #3. In downlink transmission, the PDCCH carries a downlink resource indication (DL scheduling), and the DL scheduling carries the HARQ process number of the first moment of the multi-subframe scheduling. For example, in subframe #0, the HARQ process number of the first subframe configured by the base station is "0", and the UE may calculate the HARQ process numbers of the subsequent continuously-scheduled subframes, in which no PDCCH is sent, of the multi-subframe scheduling according to the HARQ process number "0" in terms of temporal sequence, namely, the value of serial number of subframes. F or example, one of the currently-available HARQ process numbers is selected as the HARQ process number corresponding to each of subsequent subframes in an ascending order, or a minimum value may be selected from the currently-available HARQ process numbers as the HARQ process number of a subframe in which no PDCCH is sent.

The base station may transmit the newly-transmitted data packet on a corresponding resource according to a timing relationship between the downlink resource indication and the downlink data transmission, uplink ACK/NACK information. There is a mapping relationship between the uplink ACK/NACK information and the resource position of the PDCCH. For a downlink data packet with a downlink resource indication, the terminal may send the corresponding uplink ACK/NACK information on a corresponding uplink ACK/NACK resource according to the PDCCH. For a subframe without a downlink resource indication, each UE may be notified of specific channel position or channel range information for transmitting the uplink ACK/NACK information by a higher layer signaling. For example, the UE is notified by the higher layer signaling that corresponding uplink ACK/NACK information may be transmitted on the uplink ACK/NACK resources indicated by the uplink subframe #5, subframe #6, and subframe #7 when downlink newly-transmitted data packets are transmitted in subframe #1, subframe #2, subframe #3. These uplink ACK/NACK resources are reserved for the terminal and notified the terminal by the base station according to the number of cell users and transmitted data packets. For example, specific resource position, resource numbering, corresponding resource group and other information corresponding to the uplink ACK/NACK resources may be notified by the higher layer signaling or physical layer signaling, then the specific resource position or resource numbering of the corresponding uplink ACK/NACK information is indicated by other signaling.

As shown in FIG. 4a, in the first multi-subframe scheduling, the base station sends the downlink resource indication (DL scheduling) carrying HARQ process #0 by the PDCCH in subframe #0, for scheduling data of the current subframe #0. If the number of continuously-scheduled subframes is four, the DL scheduling may further include HARQ process numbers of subframe #1, subframe #2, subframe #3 and other configuration indication. If the interval at which the UE sends feedback information to the base station is four subframes, the UE returns the uplink ACK/NACK information of the HARQ process number corresponding to the downlink data to the base station. For HARQ process #0 and process #1, the UE correctly sends the feedback uplink ACK information to the base station in subframe #4 and subframe #5 respectively. If errors occur to HARQ process #2 and HARQ process #3 in transmission, the UE feeds back the corresponding uplink NAK information to the base station in subframe #6 and subframe #7 respectively. Therefore, the subframe of the HARQ process #2 and the HARQ process #3 need to be retransmitted. For easy to distinguish, in FIG. 4a, a suffix X is add to the process number which needs to be retransmitted. If downlink non-synchronous adaptive retransmission is adopted, the PDCCH scheduled for retransmission may have a single-subframe configuration. It is possible in a system that, for a scheduling reason, the subframe #8, subframe #9, subframe #10 and the subframe #11 do not be allocated to the current terminal to perform retransmission of a newly-transmitted data packet. A t the moment when retransmission needs to be performed, if there is no newly-transmitted data packet to be allocated to the current terminal at the corresponding moment of the subframe, the terminal may determine that this data packet is a retransmitted data packet according to the received PDCCH. In FIG. 4a, it is assumed that a retransmission interval is 4 subframes, and HARQ process #2 and HARQ process #3 may be retransmitted in subframe 9 and subframe 10 respectively. In subframe #12, the base station configures the multi-subframe scheduling of one newly-transmitted data packet, the downlink resource indication (DL scheduling) carrying available and minimum HARQ process #0 indicates that the newly-transmitted data packet is transmitted in subframe #12 and that the continuous 4 subframes including subframe #12 are used for newly-transmitted data packet transmission. In each multi-subframe scheduling, the UE may select one of the currently-available HARQ process numbers as a HARQ process number corresponding to a current subframe in an ascending order, or may select a minimum value from the currently-adaptive HARQ process numbers as the HARQ process number of the current subframe. As shown in FIG. 4a, the available HARQ process numbers in subframe #15 include "1" (released in subframe #5), "4" (released in subframe #8) and "7" (released in subframe #11). If the method in an ascending order is adopted, since the HARQ process number corresponding to subframe #12 of the pervious newly-transmitted data packet is "0", the HARQ process number corresponding to subframe #15 may be "1". If the method of selecting the minimum value is adopted, the HARQ process number corresponding to subframe #15 may be also "1". If the HARQ process number corresponding to subframe #12 is "3", the HARQ process number corresponding to the subframe #15 may be "3" in an ascending order, and the HARQ process number corresponding to the subframe #15 may be "1" according to the order of the minimum value.

Furthermore, in multi-subframe scheduling, it is possible that the newly-transmitted data packet of the HARQ process number indicated by the resource indication comes into conflict with the retransmitted data packet of the HARQ process number indicated by a retransmission resource indication signaling in a same scheduling subframe. At this time, the retransmitted data packet of the HARQ process number included in the retransmission resource indication signaling is preferably scheduled. For example, in the second multi-subframe scheduling in FIG. 4a, the DL scheduling carrying HARQ process #4 sent by the base station in subframe #4 further includes the HARQ process numbers of continuous subframe #5, subframe #6 and subframe #7. When an error occurs to the transmission of newly-transmitted data packet of HARQ process #5 of subframe #5, the UE returns the uplink NAK information in subframe #9 to the base station, and the base station may send a DL scheduling of retransmission scheduling, a retransmission resource indication signaling, for indicating the scheduling on the retransmitted data packet of HARQ process #5. At this time, subframe #13 which should originally be used for transmitting a newly-transmitted data packet in the third multi-subframe scheduling is occupied by retransmission, and the newly-transmitted data packet whose subframe resource is occupied may be transmitted in the next idle subframe #14 in which there is no retransmission. If the number of continuously-scheduled subframes is not prolonged, this multi-subframe scheduling may end after the scheduling of four subframes is accomplished, as shown in FIG. 4a. If the number of continuously-scheduled subframes is prolonged, this multi-subframe scheduling may end after the HARQ process numbers which originally need be scheduled continuously are processed completely. As shown in FIG. 4b, a schematic diagram of prolonging the number of continuously-scheduled subframes of the third embodiment of method of multi-subframe scheduling according to the present invention is illustrated. In the third multi-subframe scheduling, subframes #12, #13, #14, #15 need originally to be occupied to schedule newly-transmitted data packets of HARQ processes #0, #1, #4, #7 respectively, and the newly-transmitted data packet of HARQ process #1 is originally transmitted in subframe #13. However, since the base station sends the retransmission resource indication signaling of HARQ process #5 in subframe #13, subframe #13 is occupied by the retransmitted data packet of HARQ process #5. Since the base station sends the retransmission resource indication signaling of HARQ process #6 in subframe #14, subframe #14 is occupied by the retransmitted data packet of HARQ process #6, the scheduling of newly-transmitted data packet of HARQ process #1 is postponed to subframe #15 to be performed, the scheduling of newly-transmitted data packet of HARQ process #4 is postponed to subframe #16 to be performed, and the scheduling of newly-transmitted data packet of HARQ process #7 is postponed to subframe #17 to be performed.

In addition, in a scene of heterogeneous network, in order to avoid the interference on feedback ACK/NACK information or PDCCH caused by a strong interference cell, the base stations of adjacent cells may interact information such as position occupied by the resources, transmission time, transmission power, parameters related with interference level, measurement result, etc., of the control channels of strong interference cells, with each other through an interface between the base stations, for example, X2 interface, and the base stations may reserve resource for a ACK/NACK resource or a PDCCH according to the interacted information, for scheduling and allocating the resource position occupied by a control channel of a current cell. In one aspect, the ACK/NACK resources of the present cell and other cells may, according to the interference condition of the adjacent cells, be scheduled on actual physical resources, for example, frequency domain resources, so as to avoid interference between the adjacent cells in uplink transmission. For example, the control channel resources of base stations of the corresponding strong interference cells, for example, physical layer control channel such as UL ACK/NACK, CQI, SRI, RACH or PDCCH, etc., are allocated coordinately between the present cell and the strong interference cells, and the ACK/NACK information of the strong interference cells and the present cell are allocated coordinately in different frequency bands. In another aspect, time and frequency resources may be reserved for PDCCHs, and the transmission time of PDCCHs of the strong interference cells is interacted through an X2 interface between the base stations, so as to ensure time allocation of PDCCH of corresponding strong interference cells, thus avoiding the strong interference cells to send PDCCH in a same frequency band at the same time. As shown in FIG. 4a, since the PDCCH of cell #0 may be sent in subframe #0, and no PDCCH needs to be sent in subframe #1, subframe #2, and subframe #3, the PDCCHs of the strong interference cell #1, the strong interference cell #2 and the interference cell #3 may be sent in subframe #1, subframe #2 and subframe #3 respectively. Therefore, when the wireless network is deployed, the number of continuous transmission subframes may be determined according to the number of strong interference cells. Accordingly, a terminal in cell #0 receives data just in subframe #0, and may not receive and detect the PDCCH in subframe #1, subframe #2, and subframe #3.

The present embodiment may realize multi-subframe scheduling by carrying the Hybrid Automatic Repeat Request process number corresponding to the first scheduled subframe of each multi-subframe scheduling and the continuous scheduling indication when the base station sends the terminal the PDCCH, saving control signaling overhead of the system and improving spectrum efficiency of the system. It may be more compatible with the existing system by adopting single-subframe scheduling in retransmission. When a single PDCCH is used to perform data scheduling of multiple subframes, a resource may be reserved, and the interaction information may be sent by a control channel between base stations when there is a adjacent strong interference cell, which avoids that the control channels of the strong interference cells schedule data in the same time, thus reducing the interference between the control channels.

FIG. 5 is schematic diagram of a fourth embodiment of multi-subframe scheduling method according to the present invention. The base station sends a multi-subframe scheduling starting signaling of higher layer to a UE to start a data transmission mode of multi-subframe receiving and multi-subframe sending performed by the terminal. What is different from the first embodiment is that the number of continuously-scheduled subframes is not notified by a higher layer signaling, and a continuous scheduling indication is carried by a physical layer signaling, for example, a PDCCH, to notify the terminal the number of uplink and downlink continuously-scheduled subframes in each multi-subframe scheduling. The mode of bitmap mapping may be adopted to indicate the non-continuous subframes which need to be scheduled, or a signaling may be adopted to indicate the number of continuous subframes. In the present embodiment, the number of continuous subframes is taken as an example, and a newly-increased bit or reused bit may be used to carry a resource indication in a PDCCH. For example, in a downlink resource indication (DL scheduling) of the PDCCH, 2 bits of Redundancy Version field may be reused to carry a continuous scheduling indication, or more bits are increased to carry the continuous scheduling indication. In an uplink resource indication (UL grant), an existing padding bit may be reused to carry the continuous scheduling indication, or more bits are increased to carry the continuous scheduling indication.

The downlink transmission is taken as an example. The continuous scheduling indication of multi-subframe scheduling may be denoted as the number of continuously-scheduled subframes immediately after the subframe indicated by a PDCCH, namely the number of continuously-scheduled subframes after the first scheduled subframe. In subframe #0, a resource indication DL scheduling of multi-subframe scheduling is carried. For example, in FIG. 5, in multi-subframe scheduling, if the continuous scheduling indication in the DL scheduling of the PDCCH of subframe #0 is "4", it shows that the PDCCH indicates the resource scheduling of subframe #0, subframe #1, subframe #2, subframe #3 and subframe #4. Multiple subframes may be scheduled by one PDCCH, until the terminal reaches the maximum HARQ process thereof. If the continuous scheduling indication in the PDCCH of subframe #5 is "2", it shows that the PDCCH indicates the resource scheduling of subframe #5, subframe #6 and subframe #7. The HARQ process number of multi-subframe scheduling may be acquired from a HARQ process number field carried on the PDCCH sent by the base station, wherein the HARQ process number field indicates a process number corresponding to a data packet scheduled by the current subframe, a packet of a subframe which does not carry a PDCCH may correspond to available, idle HARQ numbers in an order. In the existing LTE Release 8 protocol, SPS transmission does not support a transmission mode of spatial multiplexing, and only supports a transmission mode of transmit diversity. In a multi-subframe scheduling mode, an activation indication of semi-persistent scheduling may be performed by more semi-persistent scheduling control channel formats, so as to support the transmission of spatial multiplexing.

Furthermore, in multi-subframe scheduling, retransmission information may be indicated in a multi-subframe manner. As shown in FIG. 5, when errors occurs to both process #4 and process #5, the UE will return uplink NAK information to the base station, HARQ process #4 and HARQ process #5 both need to be retransmitted, and the positions of the corresponding retransmission subframes may be indicated by a multi-subframe scheduling signaling in a PDCCH. In subframe #12, the base station sends a retransmission resource indication signaling of HARQ process #4 and process #5, wherein the carried HARQ process number is "4", and the continuous retransmission indication is "1", besides indicating that HARQ process #4 needs to be retransmitted, which may make UE acquire that the subframes #13 in which no PDCCH is sent needs to retransmit the retransmitted data packet of HARQ process #5.

The present embodiment may realize multi-subframe scheduling by that the base station sends the PDCCH carrying the Hybrid Automatic Repeat Request process number corresponding to each current scheduled subframe and the continuous scheduling indication to the terminal, saving control signaling overhead of the system and improving spectrum efficiency of the system. The control signaling overhead of the system may be further reduced and the performance of the system may be improved by adopting multi-subframe scheduling in retransmission.

The existing LTE protocol defines two resource indication modes of data transmission, Dynamic Scheduling (Dynamic Scheduling, DS for short) and Semi-Persistent Scheduling (Semi-Persistent Scheduling, SPS for short). In the dynamic scheduling, each newly-transmitted data packet has one corresponding control signaling, for example, a PDCCH, to notify its resource and transmission mode. The User Equipment (User Equipment, UE for short) receives downlink data and transmits uplink data according to a PDCCH sent by a Base Station (Base Station, BS for short). The PDCCH may occupy resources of one to three Orthogonal Frequency Division Multiplexing (Orthogonal Frequency Division Multiplexing, OFDM for short) symbols corresponding to several downlink subframes, so as to carry a downlink resource indication (DL scheduling) or an uplink resource indication (UL grant) to indicate the corresponding downlink, uplink transmission. The base station may adjust the number of the OFDM symbols occupied by the PDCCH according to the number of scheduled users in a cell. The less the OFDM symbols are occupied by the PDCCH, the more the resources may be carried, and the higher the corresponding spectrum efficiency of the system is. The more the resources are occupied by the PDCCH, the less the effective data is carried by resources, and the lower the corresponding spectrum efficiency of the system is. In the semi-persistent scheduling mode, the base station only sends a downlink control signaling (PDCCH) one time when the semi-persistent scheduling transmission is started, and the UE starts SPS transmission according to a position and moment indicated by the PDCCH. The UE transmits and receives newly-transmitted data packet according to a certain interval, and stops the SPS transmission until one PDCCH with a special format is received.

Since the dynamic scheduling and the semi-persistent scheduling are notified by using a PDCCH, a UE may distinguish whether this scheduling is dynamic scheduling or semi-persistent scheduling through the different IDs scrambled on the CRC of the PDCCH. The CRC of the PDCCH of the dynamic scheduling may be scrambled by a C-RNTI, and the CRC of the PDCCH of the semi-persistent scheduling is scrambled by a SPS-C-RNTI. When detecting the PDCCH scrambled by the SPS-C-RNTI, the UE learns and starts this semi-persistent transmission, and receives or transmits data according to the indication of the PDCCH. For a period of time, data is received or transmitted according to the position indicated by the PDCCH which starts semi-persistent transmission at the first time, and the resource position of SPS data packet needs not to be notified through the PDCCH every time. When the resource position of the SPS needs to be changed, a newly configured PDCCH may be used to replace the previous semi-persistent scheduled configuration at the moment when the SPS data arrives periodically, until this semi-persistent transmission is cancelled by a PDCCH with a special format scrambled by the SRS-C-RNTI. The value of interval of semi-persistent scheduling of uplink and downlink specified by the existing protocol may be 10, 20, 32, 40, 65, 80, 128, 160, 320, 640, wherein the interval is the interval of sending two semi-persistent data packets.

As for the newly-transmitted data packet in dynamic scheduling, the data resource transmitted in each subframe, in the corresponding uplink and downlink subframes, needs a corresponding PDCCH to indicate a corresponding resource position and other configuration for the configuration of data transmission. Therefore, when there is continuous newly-transmitted data which needs to be transmitted, the PDCCHs with the number of corresponding uplink and downlink data packets need to be carried in the corresponding uplink and downlink subframes so as to perform an indication. As for the retransmitted data, a synchronized non-adaptive HARQ mechanism may be adopted to perform retransmission in the uplink transmission. When a data packet is retransmitted by adopting such a mechanism, uplink data may be transmitted in a corresponding subframe according to HARQ timing and in a corresponding resource according to the configuration of previous transmission, without need for a PDCCH of the retransmitted data. A s for the uplink adaptive retransmission and the retransmitted data of the downlink data, a PDCCH is needed to carry a retransmission resource indication signaling.

FIG. 6 is a schematic flowchart of a fifth embodiment of a multi-subframe scheduling method according to the present invention. As shown in FIG. 6, in semi-persistent scheduling, the activation of uplink and downlink semi-persistent scheduling may be performed by using a PDCCH scrambled by a SPS-C-RNTI. The base station may notify, by a higher layer signaling, the UE of a semi-persistent subframe scheduling interval n and/or a semi-persistent scheduling transmission length m of semi-persistent scheduling which needs to be started. The semi-persistent scheduling transmission length m is the continuous scheduling indication in the above embodiments. Supposing that the moment at which the PDCCH is sent is a starting position of semi-persistent scheduled subframe and the semi-persistent subframe scheduling interval is n, the resource, for example, HARQ process which has same configuration as the activated PDCCH is scheduled for the terminal m times, and then the corresponding resources is released. If the system does not notify the semi-persistent scheduling transmission length m, a resource release indication may be performed by releasing a semi-persistent scheduled PDCCH.

For example, in the first multi-subframe scheduling, when the semi-persistent scheduling transmission length parameter m is "3", and the semi-persistent subframe scheduling interval n is "2", as shown in FIG. 6, the PDCCH for activating semi-persistent scheduling is sent in subframe #0, and the HARQ process number thereof is "0". Therefore, a newly-transmitted data packet corresponding to HARQ process #0 is transmitted in subframe #0. Since one subframe needs to be spaced when the semi-persistent scheduling interval n=2, data corresponding to HARQ process #1 is transmitted in the subframe #2 of the next transmission, and similarly, the newly-transmitted data packet corresponding to HARQ process #2 is transmitted in subframe #4. After transmission is finished three times, this semi-persistent scheduled PDCCH is invalidated. In the second multi-subframe scheduling, the base station may reconfigure the corresponding m=4 and n=2, and send a new semi-persistent scheduled PDCCH to perform transmission indication of this time. For example, the new PDCCH is sent in subframe #5, wherein the HARQ process number is "3", and transmission is performed based on the corresponding configuration. At this time, transmission of HARQ process #3 is performed in subframe #5, and transmission of HARQ process #4 is performed in subframe #7. Since the uplink ACK information corresponding to HARQ process #0 is fed back in subframe #4, which implies that HARQ process #0 has been released, the newly-transmitted data packet corresponding to the minimum value "0" which is selected from the currently-available HARQ process numbers is transmitted in the next transmission moment, subframe #9. Since HARQ process #1 is not been released, supposing that retransmission timing is four subframes, the retransmission scheduling of HARQ process #0 may be performed by the PDCCH carrying a retransmission resource indication signaling in subframe #10. The semi-persistent subframe scheduling interval may be set to different values, for example, 1, 2, 3, 4, 5 or the like, and the semi-persistent scheduling transmission length m may be equal to the maximum HARQ process number of the system, for example, 1 to 15.

The present embodiment may realize multi-subframe scheduling in a manner of semi-persistent scheduling by that the base station sends a PDCCH carrying an HARP process number corresponding to each current scheduled subframe and a continuous scheduling indication to the terminal, saving control signaling overhead of the system and improving spectrum efficiency of the system. The control signaling overhead of the system may be further reduced and the performance of the system may be improved by adopting multi-subframe scheduling in retransmission.

Figure 7:
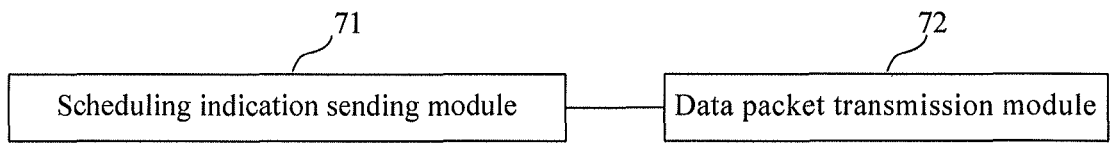
FIG. 7 is a schematic structure diagram of a first embodiment of a base station according to the present invention.

FIG. 7 is a schematic structure diagram of a first embodiment of a base station in the present invention. As shown in FIG. 7, the base station includes a scheduling indication sending module 71 and a data packet transmission module 72.

The scheduling indication sending module 71 is used for sending a terminal a continuous scheduling indication, a Hybrid Automatic Repeat Request process number corresponding to a first scheduled subframe, and a scheduling configuration parameter of a multi-subframe scheduling. The data packet transmission module 72 is used for acquiring a Hybrid Automatic Repeat Request process number corresponding to a currently-scheduling subframe according to the Hybrid Automatic Repeat Request process number corresponding to the first scheduled subframe and the continuous scheduling indication, and performing a data packet transmission of the corresponding Hybrid Automatic Repeat Request process number in the currently-scheduling subframe by using the scheduling configuration parameter. Each scheduled subframe of the multi-subframe scheduling carries one data packet, and each scheduled subframe of the multi-subframe scheduling utilizes the scheduling configuration parameter.

Particularly, the scheduling indication sending module 71 of the base station may send the terminal the continuous scheduling indication, for example, the number of all continuously-scheduled subframes or the number of continuously-scheduled subframes after the first scheduled subframe, by a higher layer signaling or a physical layer signaling, and sends the terminal the Hybrid Automatic Repeat Request process number of the currently-scheduling subframe in each multi-subframe scheduling by a physical layer signaling, for example, a PDCCH. If the newly-transmitted data packet of the Hybrid Automatic Repeat Request process number corresponding to the currently-scheduling subframe is scheduled successfully, the feedback information is Acknowledgment information; otherwise the feedback information is Non-Acknowledgment information. If there is the Non-Acknowledge information in the feedback information, the data packet transmission module 72 sends the terminal a retransmission resource indication signaling including a Hybrid Automatic Repeat Request process number corresponding to the Non-Acknowledge information. The base station may preset a retransmission delay time, and send it to the terminal by carrying it in the retransmission resource indication signaling, or notify the terminal by other signaling. After the set retransmission delay time, the base station may schedule the retransmitted data packet of the Hybrid Automatic Repeat Request process number included in the retransmission resource indication signaling.

The present embodiment may realize multi-subframe scheduling by that the scheduling indication sending module of the base station sends the scheduling configuration parameter, the continuous scheduling indication and the Hybrid Automatic Repeat Request process number corresponding to the first scheduled subframe in the multi-subframe scheduling, saving control signaling overhead of the system and improving spectrum efficiency of the system. The retransmission resource indication signaling sending module sends the terminal the retransmission resource indication signaling including the Hybrid Automatic Repeat Request process number corresponding to the Non-Acknowledgment information in retransmission, and it may be more compatible with the existing system by adopting the single-subframe scheduling.

Figure 8:
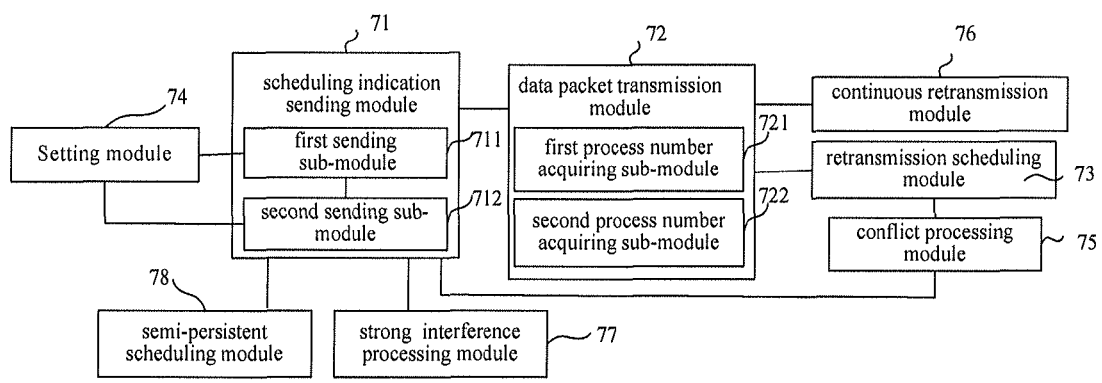
FIG. 8 is a schematic structure diagram of a second embodiment of the base station according to the present invention.

FIG. 8 is a schematic structure diagram of a second embodiment of a base station according to the present invention. As shown in FIG. 8, on the basis of the first embodiment of the base station in the present invention, the continuous scheduling indication may include the number of subframes which need to be scheduled this time, or the number of subsequent continuously-scheduled subframes, and furthermore, the scheduling indication sending module 71 may include a first sending sub-module 711 and/or a second sending sub-module 712.

The first sending sub-module 711 is used for sending the terminal a higher layer signaling carrying the continuous scheduling indication, for notifying the terminal to start or to cancel the multi-subframe scheduling, and sending the terminal a Physical Downlink Control Channel carrying the scheduling configuration parameter and the Hybrid Automatic Repeat Request process number corresponding to the first scheduled subframe. The second sending sub-module 712 is used for sending the terminal a Physical Downlink Control Channel carrying the continuous scheduling indication, the Hybrid Automatic Repeat Request process number corresponding to the first scheduled subframe and the scheduling configuration parameter.

Furthermore, the base station may include any one or more of the following modules: retransmission scheduling module 73, setting module 74, conflict processing module 75, continuous retransmission module 76, strong interference processing module 77 and semi-persistent scheduling module 78.

The setting module 74 is used for setting the continuous scheduling indication in a newly-increased bit or a reused bit of the Physical Downlink Control Channel, wherein the reused bit is a Redundancy Version field in a downlink resource indication of the Physical Downlink Control Channel or a padding bit in an uplink resource of the Physical Downlink Control Channel.

The retransmission scheduling module 73 is used for sending the terminal a retransmission resource indication signaling carrying a Hybrid Automatic Repeat Request process number corresponding to Non-Acknowledgment information, and sending or receiving a retransmitted data packet of the Hybrid Automatic Repeat Request process number corresponding to the Non-Acknowledgment information in a retransmission subframe corresponding to the retransmission resource indication signaling, to the terminal or from the terminal, if there is the Non-Acknowledgment information in feedback information acquired by transmitting the newly-transmitted data packet, when the data packet carried by each scheduled subframe of the multi-subframe scheduling is a newly-transmitted data packet.

The conflict processing module 75 is used for scheduling preferably the retransmitted packet in a same scheduling subframe, if the newly-transmitted data packet and the retransmitted data packet are scheduled in the same scheduling subframe.

The continuous retransmission module 76 is used for making the retransmission resource indication signaling further include the number of all continuous retransmission subframes corresponding to continuous multiple pieces of Non-Acknowledgment information or the number of continuous retransmission subframes after a first retransmission subframe in the retransmission resource indication signaling if there are the continuous multiple pieces of Non-Acknowledgment information in the feedback information acquired by transmitting the newly-transmitted data packet.

The strong interference processing module 77 is used for acquiring information of an adjacent cell from an interface between base stations, the information of the adjacent cell including: frequency domain position occupied by a Physical Downlink Control Channel allocated by the base station of the adjacent cell, transmission time, transmission power, or including one or more of the following: frequency domain position occupied by a Physical Uplink Control Channel allocated by the base station of the adjacent cell, transmission time, transmission power; acquiring information of a strong interference cell whose interference level is higher than a set threshold value according to information of the adjacent cell, allocating coordinately Physical Downlink Control Channels of the strong interference cell and the present cell in different subframes according to the information of the strong interference cell, and determining a scheduled subframe in which the base station of the present cell sends the Physical Downlink Control Channel of the multi-subframe scheduling; or, allocating coordinately Physical Uplink Control Channels of the strong interference cell and the present cell in different frequency bands which are not overlapped with each other.

The continuous scheduling module 78 is used for sending the terminal a semi-persistent subframe scheduling interval by a higher layer signaling in semi-persistent scheduling.

In addition, the continuous scheduling indication includes the number of all continuously-scheduled subframes, or the number of continuously-scheduled subframes after the first scheduled subframe, and the data packet transmission module 72 may further include a first process number acquiring sub-module 721 and/or a second process number acquiring sub-module 722.

The first process number acquiring sub-module 721 is used for selecting a minimum value from currently-available Hybrid Automatic Repeat Request process numbers as the Hybrid Automatic Repeat Request process number of the currently-scheduling subframe each time, according to the number of all continuously-scheduled subframes or the number of continuously-scheduled subframes after the first scheduled subframe. The second process number acquiring sub-module 722 is used for selecting one of the currently-available Hybrid Automatic Repeat Request process numbers as the Hybrid Automatic Repeat Request process number of the currently-scheduling subframe in an ascending order, according to the number of all continuously-scheduled subframes or the number of continuously-scheduled subframes after the first scheduled subframe and the Hybrid Automatic Repeat Request process number corresponding to the first scheduled subframe.

Particularly, in one case, the first sending sub-module 711 of the base station may send the terminal the continuous scheduling indication by using a higher layer signaling, for example, multi-subframe scheduling starting signaling, and send the scheduling configuration parameter and the Hybrid Automatic Repeat Request process number corresponding to the first scheduled subframe by using a physical layer signaling, for example, PDCCH. At this time, the higher layer signaling is not only used for notifying the terminal to start or to cancel multi-subframe scheduling, but also used for sending the continuous scheduling indication.

In another case, the setting module 74 of the base station may set the continuous scheduling indication in a newly-increased bit or reused bit of the Physical Downlink Control Channel, for example, in a Redundancy Version field in a downlink resource indication or a padding bit in an uplink resource indication. After the base station sends the terminal the higher layer signaling to notify the terminal to start the multi-subframe scheduling, the second sending sub-module 712 may send the terminal the scheduling configuration parameter, the continuous scheduling indication and the Hybrid Automatic Repeat Request process number corresponding to the first scheduled subframe by using the Physical Downlink Control Channel.

If the newly-transmitted data packet of the Hybrid Automatic Repeat Request process number of this scheduling is scheduled successfully, the acquired feedback information is Acknowledge information; otherwise the acquired feedback information is Non-Acknowledge information. If there are continuous Hybrid Automatic Repeat Request process numbers corresponding to the Non-Acknowledge information, the continuous retransmission module 76 may set a continuous retransmission indication corresponding to the Non-Acknowledge information in the retransmission resource indication signaling, wherein the retransmission resource indication includes the number of all continuous retransmission subframes or the number of continuous retransmission subframes after the first retransmission subframe, to indicate to the terminal the number of retransmitted data packets which need to be continuously scheduled.

If there is a conflict between the subframe included in the continuous scheduling indication and that included in the retransmission resource indication signaling, the conflict processing module 75 may schedule preferably the retransmitted data packet of the Hybrid Automatic Repeat Request process number included in the retransmission resource indication signaling, and may select simultaneously whether to prolong the number of subframes processed in this scheduling. As for the specific process, refer to the related description of the third embodiment of the method of multi-subframe scheduling according to the present invention and FIG. 3 and FIG. 4.

Furthermore, if an adjacent cell has higher interference strength on the present cell, the adjacent cell is a strong interference cell relative to the present cell. The strong interference processing module 77 of the base station of the present cell may interact with the base station of the strong interference cell, and acquire information of the adjacent strong interference cell from an interface between the base stations, then reserve time domain resource for the Physical Downlink Control Channel or reserve frequency domain resource for the feedback information according to the information of the strong interference cell, and allocate coordinately the Physical Downlink Control Channels of the strong interference cell and the present cell in the different subframes according to the reserved time domain resource, or allocate coordinately the feedback information of the strong interference cell and the present cell in different frequency bands according to the reserved frequency domain resource.

Furthermore, in semi-persistent scheduling, the semi-persistent scheduling module 78 may further send the terminal a semi-persistent subframe scheduling interval, then take the continuous scheduling indication as the semi-persistent transmission scheduling length and schedule the newly-transmitted data packet of one corresponding Hybrid Automatic Repeat Request process number in each semi-persistent subframe scheduling interval. If there is Non-Acknowledge information in the acquired feedback information, the semi-persistent scheduling module 78 schedules the retransmitted data packet of the Hybrid Automatic Repeat Request process number corresponding to the Non-Acknowledge information in every semi-persistent subframe scheduling interval after the set retransmission delay time.

The present embodiment may realize multi-subframe scheduling by that the first sending module and the second sending module of the base station sends the terminal the scheduling configuration parameter, the continuous scheduling indication and the Hybrid Automatic Repeat Request process number corresponding to the first scheduled subframe, saving control signaling overhead of the system and improving spectrum efficiency of the system. The retransmission resource indication signaling sending module sends the retransmission resource indication signaling including the Hybrid Automatic Repeat Request process number corresponding to the Non-Acknowledge information in retransmission, and it may be more compatible with the existing system by adopting single-subframe scheduling. The continuous retransmission module may further send the terminal the number of the Hybrid Automatic Repeat Request process numbers which need to be retransmitted continuously this time or the number of subsequent continuously-retransmitted Hybrid Automatic Repeat Request process numbers, to realize the multi-subframe scheduling in retransmission, which may further save the control signaling overhead of the system and improve the spectrum efficiency of the system. When a single PDCCH is used to perform data scheduling of multi-subframe, the strong interference processing module may further reserve a resource, and send interaction information by the control channel between the base stations when there is a adjacent strong interference cell, so as to avoid the control channels of the strong interference cells to schedule data in a same time, thus reducing the interference between the control channels. The semi-persistent scheduling module may further realize multi-subframe scheduling in a semi-persistent scheduling mode.

Figure 9:
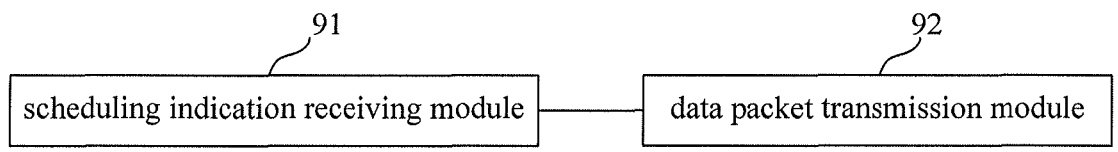
FIG. 9 is a schematic structure diagram of a first embodiment of a terminal according to the present invention.

FIG. 9 is a schematic structure diagram of a first embodiment of a terminal according to the present invention. As shown in FIG. 9, the terminal may include a scheduling indication receiving module 91 and a data packet transmission module 92.

The scheduling indication receiving module 91 is used for receiving a continuous scheduling indication, a Hybrid Automatic Repeat Request process number corresponding to a first scheduled subframe and a scheduling configuration parameter of multi-subframe scheduling sent by a base station. The data packet transmission module 92 is used for acquiring a Hybrid Automatic Repeat Request process number corresponding to a currently-scheduling subframe according to the Hybrid Automatic Repeat Request process number corresponding to the first scheduled subframe and the continuous scheduling indication, and performing a data packet transmission of the corresponding Hybrid Automatic Repeat Request process number in the currently-scheduling subframe by using the scheduling configuration parameter. Each scheduled subframe of the multi-subframe scheduling carries one data packet, and each scheduled subframe of the multi-subframe scheduling utilizes the scheduling configuration parameter.

Particularly, the base station may send the terminal the continuous scheduling indication, for example, the number of all continuously-scheduled subframes, or the number of continuously-scheduled subframes after the first scheduled subframe, by a higher layer signaling or a physical layer signaling, and send the terminal the scheduling configuration parameter and a Hybrid Automatic Repeat Request process number corresponding to the first scheduled subframe in each multi-subframe scheduling by a physical layer signaling, for example, a PDCCH. After the scheduling indication receiving module 91 of the terminal receives the scheduling configuration parameter, the continuous scheduling indication and the Hybrid Automatic Repeat Request process number corresponding to the first scheduled subframe, if there is Non-Acknowledge information in feedback information acquired by scheduling a newly-transmitted data packet of a Hybrid Automatic Repeat Request process number corresponding to a currently-scheduling subframe, the data packet transmission module 92 may receive a retransmission resource indication signaling including a Hybrid Automatic Repeat Request process number corresponding to the Non-Acknowledge information sent by the base station. The base station may preset a retransmission delay time, and send it to the terminal by carrying it in the retransmission resource indication signaling, or notify the terminal by other signaling. After the preset retransmission delay time, the base station may schedule the retransmitted data packet of the Hybrid Automatic Repeat Request process number included in the retransmission resource indication signaling.

The present embodiment may realize multi-subframe scheduling by that the scheduling indication receiving module of the terminal receives the scheduling configuration parameter, the continuous scheduling indication and the Hybrid Automatic Repeat Request process number corresponding to the first scheduled subframe sent by the base station, saving control signaling overhead of the system and improve spectrum efficiency of the system. The data packet transmission module receives the retransmission resource indication signaling including the Hybrid Automatic Repeat Request process number corresponding to the Non-Acknowledge information sent in retransmission, and it may be more compatible with the existing system by adopting single-subframe scheduling.

Figure 10:
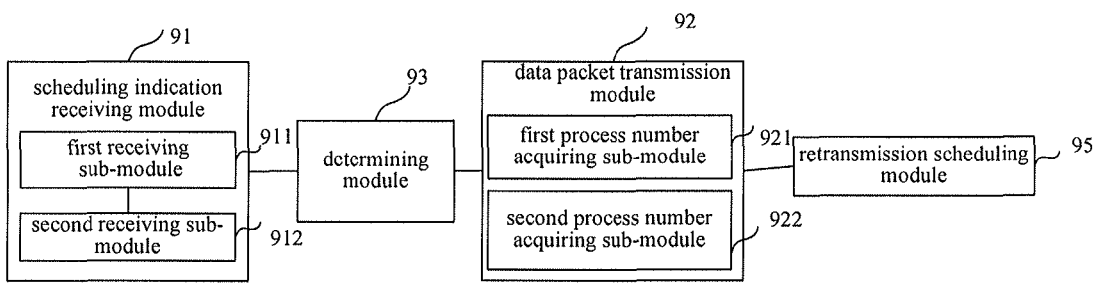
FIG. 10 is a schematic structure diagram of a second embodiment of the terminal according to the present invention.

FIG. 10 is a schematic structure diagram of a second embodiment of a terminal according to the present invention. As shown in FIG. 10, on the basis of the first embodiment of the terminal according to the present invention, the continuous scheduling indication includes the number of the subframes which need to be scheduled this time or the number of subsequent continuously-scheduled subframes, and the scheduling indication receiving module 91 may include a first receiving sub-module 911 and/or a second receiving sub-module 912.

The first receiving sub-module 911 is used for receiving a higher layer signaling carrying the continuous scheduling indication sent by the base station, the higher layer signaling being used for notifying the terminal to start or to cancel the multi-subframe scheduling, and receiving a Physical Downlink Control Channel carrying the scheduling configuration parameter and the Hybrid Automatic Repeat Request process number corresponding to the first scheduled subframe sent by the base station. The second receiving sub-module 912 is used for receiving a Physical Downlink Control Channel carrying the continuous scheduling indication, the Hybrid Automatic Repeat Request process number corresponding to the first scheduled subframe and the scheduling configuration parameter sent by the base station.

Furthermore, the terminal may include a determining module 93 and/or a retransmission scheduling module 95.

The determining module 93 is used for determining whether this scheduling is single-subframe scheduling or multi-subframe scheduling, according to a downlink transmission control information format in the received Physical Downlink Control Channel. The retransmission scheduling module 95 is used for receiving a retransmission resource indication signaling carrying a Hybrid Automatic Repeat Request process number corresponding to the Non-Acknowledgment information sent by the base station, and sending or receiving the retransmitted data packet of the Hybrid Automatic Repeat Request process number corresponding to the Non-Acknowledgment information in a retransmission subframe corresponding to the retransmission resource indication signaling, to the base station or from the base station, if there is the Non-Acknowledgment information in the feedback information acquired by transmitting the newly-transmitted data packet, when the data packet carried by each scheduled subframe of the multi-subframe scheduling is a newly-transmitted data packet.

Furthermore, the continuous scheduling indication includes the number of all continuously-scheduled subframes, or the number of continuously-scheduled subframes after the first scheduled subframe, and the data packet transmission module may include a first process number acquiring sub-module 921 and/or a second process number acquiring sub-module 922.

The first process number acquiring sub-module 921 is used for selecting a minimum value from currently-available Hybrid Automatic Repeat Request process numbers as the Hybrid Automatic Repeat Request process number of a currently-scheduling subframe each time, according to the number of all continuously-scheduled subframes or the number of continuously-scheduled subframes after the first scheduled subframe. The second process number acquiring sub-module 922 is used for selecting one of the currently-available Hybrid Automatic Repeat Request process numbers as the Hybrid Automatic Repeat Request process number of the currently-scheduling subframe in an ascending order, according to the number of all continuously-scheduled subframes or the number of continuously-scheduled subframes after the first scheduled subframe and the Hybrid Automatic Repeat Request process number corresponding to the first scheduled subframe.

Particularly, in one case, the first receiving sub-module 911 may receive a higher layer signaling for notifying the terminal to start or to cancel the multi-subframe scheduling sent by the terminal, for example, a multi-subframe scheduling starting signaling of the higher layer, wherein the multi-subframe scheduling starting signaling may include a continuous scheduling indication; then receive the Physical Downlink Control Channel carrying the scheduling configuration parameter and the Hybrid Automatic Repeat Request process number corresponding to the first scheduled subframe sent by the base station. In another case, the first receiving sub-module 911 may receive the multi-subframe scheduling starting signaling of the higher layer sent by the base station, wherein the multi-subframe scheduling starting signaling is only used for indicating the starting of the multi-subframe scheduling, but does not include the continuous scheduling indication, then the second receiving sub-module 912 receives the Physical Downlink Control Channel carrying the scheduling configuration parameter, the continuous scheduling indication and the Hybrid Automatic Repeat Request process number corresponding to the first scheduled subframe sent by the base station. The determining module 93 may determine whether this scheduling is single-subframe scheduling or multi-subframe scheduling according to the downlink transmission control information format in the received Physical Downlink Control Channel. The first process number acquiring sub-module 921 and the second process number acquiring sub-module 922 may acquire a Hybrid Automatic Repeat Request process number corresponding to a current subframe, according to the continuous scheduling indication and the Hybrid Automatic Repeat Request process number corresponding to the first scheduled subframe in each multi-subframe scheduling. For example, the first process number acquiring sub-module 921 selects a minimum value from currently-available Hybrid Automatic Repeat Request process numbers as the Hybrid Automatic Repeat Request process number of the currently-scheduling subframe each time, according to the number of all continuously-scheduled subframes or the number of continuously-scheduled subframes after the first scheduled subframe; or, the second process number acquiring sub-module selects one of the currently-available Hybrid Automatic Repeat Request process numbers as the Hybrid Automatic Repeat Request process number of the currently-scheduling subframe in an ascending order, according to the number of all continuously-scheduled subframes or the number of continuously-scheduled subframes after the first scheduled subframe and the Hybrid Automatic Repeat Request process number corresponding to the first scheduled subframe in the continuous scheduling indication. If there is Non-knowledge information in the feedback information acquired by scheduling newly-transmitted data packet of the Hybrid Automatic Repeat Request process number corresponding to the currently-scheduling subframe, the data packet transmission module 92 may receive the retransmission resource indication signaling including the Hybrid Automatic Repeat Request process number corresponding to the Non-Acknowledge information sent by the base station. The base station may preset a retransmission delay time and send it to the terminal by carrying it in the retransmission resource indication signaling, or notify the terminal by other signaling. After the set retransmission delay time, the base station may schedule the retransmitted data packet of the Hybrid Automatic Repeat Request process number included in the retransmission resource indication signaling.

The present embodiment may realize a multi-subframe scheduling by that the first receiving sub-module and the second receiving sub-module of the terminal receive the scheduling configuration parameter, the continuous scheduling indication and the Hybrid Automatic Repeat Request process number corresponding to the first scheduled subframe sent by the base station, saving control signaling overhead of the system and improving spectrum efficiency of the system. The data packet transmission module receives the retransmission resource indication signaling including the Hybrid Automatic Repeat Request process number corresponding to the Non-Acknowledge in retransmission, and it may be more compatible with the existing system by adopting single-subframe scheduling. The control signaling overhead of the system may be further reduced and the performance of the system may be improved by adopting multi-subframe scheduling in retransmission.

Figure 11:
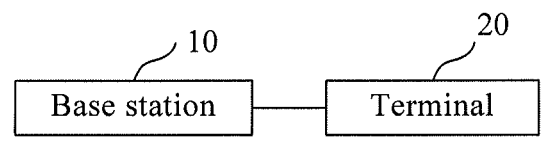
FIG. 11 is a schematic structure diagram of an embodiment of a system of multi-subframe scheduling according to the present invention.

FIG. 11 is a schematic structure diagram of an embodiment of a system of multi-subframe scheduling according to the present invention. As shown in FIG. 11, the system of multi-subframe scheduling may include a base station 10 with any one of above structures and a terminal 20 with any one of above structures.

Particularly, the base station 10 may send the terminal 20 a continuous scheduling indication, for example, the number of all continuously-scheduled subframes or the number of continuously-scheduled subframes after the first scheduled subframe, by a higher layer signaling or a physical layer signaling, and send the terminal 20 a scheduling configuration parameter and a Hybrid Automatic Repeat Request process number corresponding to a first scheduled subframe by a physical layer signaling, for example, a PDCCH. If the newly-transmitted data packet of a Hybrid Automatic Repeat Request process number corresponding to a currently-scheduling subframe is scheduled successfully, the feedback information is Acknowledge information; otherwise the feedback information is Non-Acknowledge information. If there is the Non-Acknowledge information in the feedback information, the base station 10 sends the terminal 20 a retransmission resource indication signaling including the Hybrid Automatic Repeat Request process number corresponding to the Non-Acknowledge information. The base station 10 may preset a retransmission delay time, and send it to the terminal by carry it in the retransmission resource indication signaling, or notify the terminal by other signaling. After the preset retransmission delay time, the base station 10 may schedule a retransmitted data packet of the Hybrid Automatic Repeat Request process number included in the retransmission resource indication signaling.

The present embodiment may realize multi-subframe scheduling by that the base station sends the scheduling configuration parameters, the continuous scheduling indication and the Hybrid Automatic Repeat Request process number corresponding to the first scheduled subframe of the multi-subframe scheduling, saving control signaling overhead of the system and improving spectrum efficiency of the system. It may be more compatible with the existing system by adopting single-subframe scheduling in retransmission, while the control signaling overhead of the system may be further reduced and the performance of the system may be improved by adopting multi-subframe scheduling in retransmission.

As for the specific method that the base station, terminal and system perform multi-subframe scheduling according to the embodiments of the present invention, refer to the related description and figures in the first embodiment to the fifth embodiment of the method of multi-subframe scheduling according to the present invention.

Those skilled in the art may understand that all of or part of the steps of the method in any of the embodiments above may be implemented by a hardware relevant to a program or instruction. The program may be stored in a computer readable storage medium. The program executes the steps of above method embodiments when running. The storage medium may include various media which may store the program code, such as ROM, RAM, or a magnetic disk, or an optical disk, etc.

It should be noted that the foregoing embodiments are only illustrative, and not for use in limiting the technical solution of the present invention. Although the present invention is described in detail with reference to the above embodiments, the persons of ordinary skills in the art should understand that modifications to the solutions recited in above embodiments or substitutions to part of technical features therein are possible. Such modifications or substitutions will not make the nature of corresponding solutions depart from the spirit and scopes of the solutions of the embodiments of the present invention.

What is claimed is:

1. A method of multi-subframe scheduling, comprising:
    sending to a terminal: a higher layer signaling carrying a continuous scheduling indication for indicating the number of continuously-scheduled subframes to notify the terminal to start or to cancel the multi-subframe scheduling, and a first Physical Downlink Control Channel (PDCCH) carrying a first Hybrid Automatic Repeat Request (HARQ) process number corresponding to a first scheduled subframe and a scheduling configuration parameter of multi-subframe scheduling;
    acquiring, according to the first HARQ process number and the continuous scheduling indication, a second Hybrid Automatic Repeat Request (HARQ) process number corresponding to a currently-scheduling subframe;
    performing, in the currently-scheduling subframe, a data packet transmission of the second HARQ process number using the scheduling configuration parameter, wherein the second HARQ process number is selected from currently-available HARQ process numbers according to the continuous scheduling indication and each scheduled subframe of the multi-subframe scheduling carries one data packet and utilizes the scheduling configuration parameter;
    acquiring information of an adjacent cell from an interface between base stations, wherein the information of the adjacent cell comprises one or more of the following: frequency domain position occupied by a second PDCCH allocated by a base station of the adjacent cell, transmission time and transmission power, or comprises one or more of the following: frequency domain position occupied by a first Physical Uplink Control Channel allocated by the base station of the adjacent cell, transmission time and transmission power; and
    acquiring information of a strong interference cell whose interference level is higher than a set threshold value according to the information of the adjacent cell, allocating coordinately a third PDCCH of the strong interference cell and the first PDCCH of the present cell in different subframes according to the information of the strong interference cell, and determining a scheduled subframe in which the base station of the present cell sends the first PDCCH of the multi-subframe scheduling; or, allocating coordinately second Physical Uplink Control Channels of the strong interference cell and the present cell in different frequency bands which are not overlapped with each other.

2. The method of multi-subframe scheduling according to claim 1, further comprising;
    setting the continuous scheduling indication in either a new increased bit or in a reused bit of the first PDCCH, wherein the reused bit is either a Redundancy Version field in a downlink resource indication of the first PDCCH or a padding bit in an uplink resource indication of the first PDCCH.

3. The method of multi-subframe scheduling according to claim 1, further comprising:
    sending the terminal a semi-continuous subframe scheduling interval by a higher layer signaling in semi-continuous scheduling.

4. The method of multi-subframe scheduling according to claim 1, wherein the continuous scheduling indication comprises the number of all continuously-scheduled subframes or the number of continuously-scheduled subframes after the first scheduled subframe, and the process of acquiring the second HARQ process number comprises:

selecting a minimum value from currently-available HARQ process numbers as the second HARQ process number of the currently-scheduling subframe each time, according to the number of all continuously-scheduled subframes or the number of continuously-scheduled subframes after the first scheduled subframe; or selecting one of the currently-available HARQ process numbers as the second HARQ process number of the currently-scheduling subframe in an ascending order, according to the number of all continuously-scheduled subframes or the number of continuously-scheduled subframes after the first scheduled subframe and the first HARQ process number corresponding to the first scheduled subframe.

5. The method of multi-subframe scheduling according to claim 1, wherein the data packet carried by each scheduled subframe of the multi-subframe scheduling is a newly-transmitted data packet, the method further comprising:

sending to the terminal a retransmission resource indication signaling carrying a third HARQ process number corresponding to Non-Acknowledgment information if there is the Non-Acknowledgment information in feedback information acquired by transmitting the newly-transmitted data packet, and sending or receiving a retransmitted data packet of the third HARQ process number corresponding to the Non-Acknowledgment information in a retransmission subframe corresponding to the retransmission resource indication signaling, to the terminal or from the terminal.

6. The method of multi-subframe scheduling according to claim 5, further comprising:

scheduling preferably the retransmitted packet in a same scheduling subframe, if the newly-transmitted data packet and the retransmitted data packet are scheduled in the same scheduling subframe.

7. The method of multi-subframe scheduling according to claim 5, wherein the retransmission resource indication signaling further comprises the number of all continuous retransmission subframes corresponding to continuous multiple pieces of the Non-Acknowledgment information or the number of continuous retransmission subframes after a first retransmission subframe, if there are the continuous multiple pieces of the Non-Acknowledgment information in the feedback information acquired by transmitting the newly-transmitted data packet.

8. A base station, comprising: a transmitter and a processor, wherein:

the transmitter is configured to send to a terminal a higher layer signaling carrying a continuous scheduling indication for indicating the number of continuously-scheduled subframes to notify the terminal to start or to cancel the multi-subframe scheduling, and a first Physical Downlink Control Channel (PDCCH) carrying a first Hybrid Automatic Repeat Request (HARQ) process number corresponding to a first scheduled subframe and a scheduling configuration parameter of multi-subframe scheduling;

the processor is configured to acquire a second Hybrid Automatic Repeat Request (HARQ) process number corresponding to a currently-scheduling subframe according to the first HARQ process number corresponding to the first scheduled subframe and the continuous scheduling indication, the transmitter is further configured to a data packet transmission of the corresponding second HARQ process number in the currently-scheduling subframe by using the scheduling configuration parameter, the second HARQ is selected from currently-available HARQ process numbers according to the continuous scheduling indication, and each scheduled subframe of the multi-subframe scheduling carries one data packet and utilizes the scheduling configuration parameter, the processor is further configured to set the continuous scheduling indication in either a new increased bit or in a reused bit of the first PDCCH, wherein the reused bit is either a Redundancy Version field in a downlink resource indication of the first PDCCH or a padding bit in an uplink resource indication of the first PDCCH;

the transmitter is further configured to send the terminal a retransmission resource indication signaling carrying a third HARQ process number corresponding to Non-Acknowledgment information, and send or receive a retransmitted data packet of the third HARQ process number corresponding to the Non-Acknowledgment information in a retransmission subframe corresponding to the retransmission resource indication signaling, to the terminal or from the terminal, if there is the Non-Acknowledgment information in feedback information acquired by transmitting the newly-transmitted data packet, when the data packet carried by each scheduled subframe of the multi-subframe scheduling is a newly-transmitted data packet;

the processor is further configured to schedule preferably the retransmitted packet in a same scheduling subframe, if the newly-transmitted data packet and the retransmitted data packet are scheduled in the same scheduling subframe;

the transmitter is further configured to make the retransmission resource indication signaling further comprise the number of all continuous retransmission subframes corresponding to continuous multiple pieces of the Non-Acknowledgment information or the number of continuous retransmission subframes after a first retransmission subframe, if there are the continuous multiple pieces of the Non-Acknowledgment information in the feedback information acquired by transmitting the newly-transmitted data packet;

the processor is further configured to acquire information of an adjacent cell from an interface between base stations, the information of the adjacent cell comprising one or more of the following: frequency domain position occupied by a second PDCCH allocated by a base station of the adjacent cell, transmission time and transmission power, or comprising one or more of the following: frequency domain position occupied by a first Physical Uplink Control Channel allocated by the base station of the adjacent cell, transmission time and transmission power, and acquiring information of a strong interference cell whose interference level is higher than a set threshold value according to the information of the adjacent cell, and allocate coordinately a third PDCCH of the strong interference cell and the first PDCCH of the present cell in different subframes according to the information of the strong interference cell, and determine a scheduled subframe in which the base station of the present cell sends the first PDCCH of the multi-subframe scheduling; or, allocate allocating coordinately second Physical Uplink Control Channels of the strong interference cell and the present cell in different frequency bands which are not overlapped with each other;

the transmitter is further configured to send a semi-persistent subframe scheduling interval b a higher layer signaling in semi-persistent scheduling.

9. The base station according to claim 8, wherein the continuous scheduling indication comprises the number of all continuously-scheduled subframes, or the number of continuously-scheduled subframes after the first scheduled subframe;

the processor is configured to select a minimum value from currently-available HARQ process numbers as the second HARQ process number of the currently-scheduling subframe each time, according to the number of all continuously-scheduled subframes or the number of continuously-scheduled subframes after the first scheduled subframe; or the processor is configured to is configured to select one of the currently-available HARQ process numbers as the second HARQ process number of the currently-scheduling subframe in an ascending order, according to the number of all continuously-scheduled subframes or the number of continuously-scheduled subframes after the first scheduled subframe and the first HARQ process number corresponding to the first scheduled subframe.

* * * * *